March 31, 1959 B. S. PARMET 2,880,362

COLOR TELEVISION RECEIVER

Filed May 26, 1955

INVENTOR.
Bernard S. Parmet,
BY
Mueller & Aichele
Att'ys.

United States Patent Office 2,880,362

Patented Mar. 31, 1959

2,880,362

COLOR TELEVISION RECEIVER

Bernard S. Parmet, Elmwood Park, Ill., assignor to Motorola, Inc., Chicago, Ill., a corporation of Illinois Application May 26, 1955, Serial No. 511,207

10 Claims. (Cl. 315—13)

This invention relates to color television receivers of the type using a tri-beam cathode-ray tube, and more particularly to an improved beam convergence system for use in such a receiver.

It is usual in present-day color television receivers to employ cathode ray reproducing tubes in which a plurality of electron beams are emitted by spaced sources at one end of the tube and are directed at, and scanned across, a viewing screen at the other end of the tube. This viewing screen may be composed of closely spaced groups of three phosphor dots or triads with each dot in a triad producing a certain primary color when impinged upon by a beam. Therefore, each triad may consist of an element of a complete color image, which element assumes a hue corresponding to the relative excitation of the three phosphor dots in the particular triad. The human eye may then view a complete color image on the screen which in reality consists of many triads each of a certain hue. The three electron beams are, of course, separately modulated by different components of the received color television signal to excite the triads so that they produce light of a color corresponding to an element of the televised scene.

With the three electron beams being emitted from spaced sources and scanned across a comparatively flat screen by a common deflection system as is customary in the above described receiver, it is apparent that the beams will not necessarily strike the proper dot in each triad during the scanning operation. This is so since various points of the screen will be at different distances from the beam sources and therefore the beams will travel varying distances to the different triads. Accordingly, correction must be applied to each beam for proper registry or convergence. Such correction may be achieved by dynamic convergence apparatus which provides a varying field to maintain the registration of the beams during scanning. In practice it is common to provide both a manually adjustable static field and a manually adjustable dynamically varying field so that the beams may be properly converged in a certain position of the screen by the static field, and maintained so converged during the scanning operation by the dynamic field. Both the static and dynamic fields are made adjustable so that adjustment for particular circuit parameters and conditions may be made.

However, it has been found that in aligning such a color television receiver, if the static field is adjusted to converge the beams at one spot on the screen, for example the center, and then it is attempted to adjust the dynamic field as the beams are scanned, the dynamic field will add to the static field causing misconvergence of the electron beams at the center. It is apparent that the two fields must be varied until both together give proper convergence at all positions on the screen and that due to the interdependence, the process will be of the "cut and try" variety. Therefore, alignment becomes time consuming and optimum convergence adjustment is difficult.

It is an object of the present invention to provide a beam convergence circuit for a color television receiver which permits simple and expeditious adjustment of the static and dynamic convergence apparatus in a tri-beam cathode ray tube.

Another object is to provide a convergence control circuit for a color television receiver which prevents undesired interaction between the static and dynamic convergence fields used to converge the beams in a tri-beam cathode ray tube and which permits separate adjustment of each signal without affecting the other.

A feature of the invention is the provision of an improved beam convergence system for a tri-beam cathode ray tube which includes a suitable circuit for maintaining the peak amplitude of the dynamic convergence signal clamped at an established level for all adjustments of the amplitude of the dynamic signal in order that such adjustments may be made independently of pre-set static adjustments, thus simplifying the adjustment of the system for converging the beams in all scanned positions.

Another feature of the invention is the provision of such a system in which such clamping is accomplished by a diode in the grid circuit of a triode amplifier for the dynamic signal.

Yet another feature of the invention is the provision of such a system in which such clamping is accomplished by grid rectification in the triode amplifier.

A further feature is the provision of convergence circuits for the individual beams in a tri-beam cathode ray tube, each circuit including a pair of electron discharge devices, the devices having self-biased grid circuits coupled respectively to sources of vertical and horizontal dynamic convergence signals and the devices further including plate circuits coupled to a dynamic convergence yoke to provide a dynamic magnetic field for horizontal and vertical convergence of a corresponding one of the three electron beams, with the grid circuits clamping the dynamic signals so that the dynamic convergence field can rise no higher than a pre-established static convergence field.

Further objects, features and the attending advantages thereof will be apparent upon consideration of the following description when taken in conjunction with the drawing in which, Fig. 1 is a schematic diagram of a color television receiver which may employ the invention;

This invention provides a circuit for supplying to the convergence elements of a tri-beam cathode ray tube suitable dynamic and static convergence control signals. An electron valve may be used to amplify the dynamic control signal after which this signal is applied to the convergence elements. The input circuit to the valve includes a clamping network which is regulated by a potential related to the static convergence field so that adjustment of the dynamic convergence field may be made independent of the static adjustments. Thus, the invention may take the form of an amplifier having a self-biased control grid, the plate current of which supplies a static convergence signal and the variable signal output of which consists of a dynamic convergence signal clamped to rise no higher than the level of the static signal. Or, alternatively, the apparatus may include an amplifier valve having an input circuit clamped to a certain level by means of a biased diode. In the latter apparatus, the bias of the diode may be related to the static convergence signal supplied to the convergence electrode so that the dynamic signal adjustment is independent of the static signal adjustment.

Figure 1:
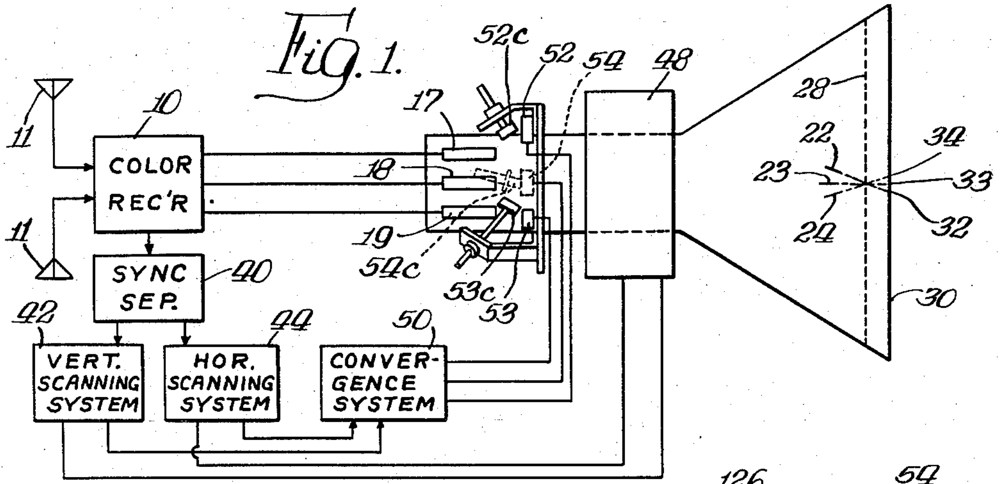

Referring now to the drawing, Fig. 1 shows a color television receiver 10 coupled to antenna 11 with the receiver providing appropriate color signals for the tri-beam cathode ray tube 15. Such color signals are applied respectively to the electron beam sources 17, 18 and 19 which produce electron beams 22, 23 and 24 (shown greatly out of proportion for clarity). An apertured shadow mask 28 is disposed near the cathode ray tube screen 30, and beams 22—24 are converged in the plane of this mask so that they pass through the apertures therein and impinge upon phosphor dots 32, 33 and 34 which form a triad. As previously explained, screen 30 includes a great number of triads and energization of these causes formation of an image which appears to the human eye as the televised scene in full color.

Also coupled to the receiver 10 is a synchronizing signal separator circuit 40 which, together with a vertical scanning system 42 and a horizontal scanning system 44, comprise the sweep system of the receiver. Systems 42 and 44 are coupled to the deflection yoke 48, which is supported on the neck of the cathode ray tube 15 so that deflection signals applied to this yoke from the horizontal and vertical circuits produce suitable scanning of the electron beams in vertical and horizontal directions across the shadow mask 28 and screen 30. However, it may be seen that, as the electron beams are scanned across the shadow mask so that they impinge upon different triads to produce a complete picture, the beams will travel different distances in order to reach the edges of the screen than they will in traveling to the center of the screen. Therefore, if the beams are to be maintained converged in the plane of the shadow mask so as to pass through the apertures and impinge upon the proper phosphor dots, the point of convergence must vary continually throughout each scanning cycle.

It has been found that a signal of parabolic wave shape producing a field to influence a given beam will properly effect such convergence. Accordingly, a convergence control system 50 is coupled to the horizontal and vertical scanning circuits 44 and 42 in order to develop essentially parabolic dynamic convergence signals synchronized with the scanning system. These convergence signals are applied to three dynamic convergence yokes 52, 53 and 54 of cathode ray tube 15, and which are individually associated with each of the three beams in the tube. The system also includes corresponding permanent magnets 52*c*, 53*c*, 54*c* which are supported adjacent respective ones of the convergence yokes to establish manually adjustable static convergence fields for each of the three beams in the tube.

Figures 2, 3, 4:
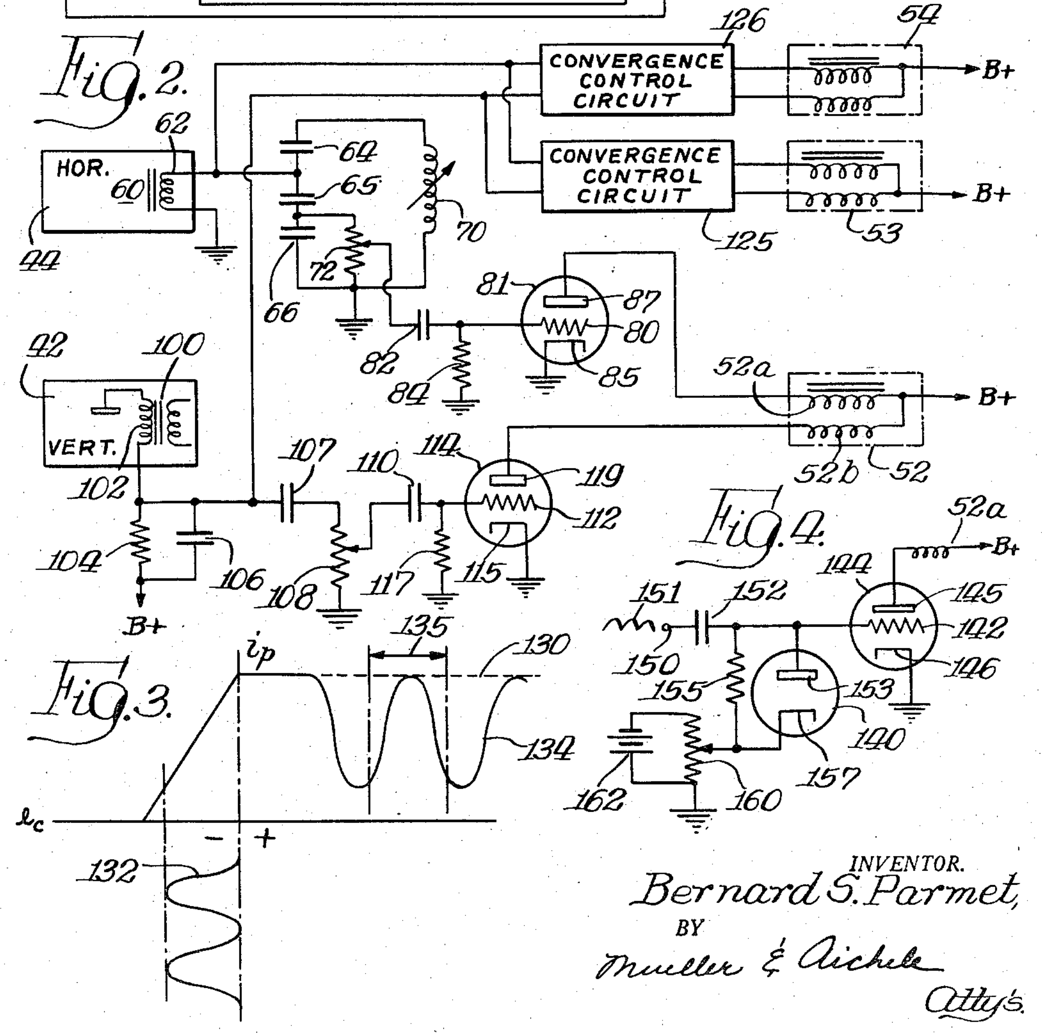
Fig. 2 is a circuit diagram of a portion of the beam convergence circuit incorporating the invention.
Fig. 3 is a graph useful in explaining the operation of the circuit.
Fig. 4 is a further embodiment of the invention.

The circuit of Fig. 2 shows, in part, the connection of the convergence system 50. It may be seen that the horizontal output transformer 60 in circuit 44 includes a winding 62 which has a terminal connected to capacitors 64 and 65. These capacitors, in addition to capacitor 66, are series connected across inductor 70, all of which form a tuned circuit at the horizontal deflection frequency. A second terminal of winding 62 is connected to ground, as is the junction of capacitor 66 and inductor 70. Potentiometer 72 is coupled across capacitor 66 and has a movable arm connected to grid 80 of a triode electron tube 81 through coupling capacitor 82. A D.C. return path is provided for grid 80 through a grid-leak resistor 84 to ground, and the cathode 85 of tube 81 is also returned to ground. Anode 87 of the tube is coupled through a winding 52*a* of convergence yoke 52 to B+.

The vertical output transformer 100 in circuit 42 includes a primary winding 102 which is coupled to B+ through a parallel combination of a resistor 104 and a capacitor 106. The junction point of primary winding 102 and this parallel resistor-capacitor combination is connected through a capacitor 107 and a potentiometer 108 to ground. The movable arm of potentiometer 108 is connected through a coupling capacitor 110 to the grid 112 of electron tube 114. Cathode 115 is connected to ground and a ground return for grid 112 is provided by grid-leak resistor 117. Anode 119 of tube 114 is connected through a winding 52*b* of convergence yoke to B+.

Winding 62 of the horizontal output transformer 60 is also connected to convergence control circuits 125 and 126, as is winding 102 of vertical output transformer 100. Circuits 125 and 126 are connected respectively to convergence yokes 53 and 54, and these circuits may correspond in their wiring connections to the circuits coupled to convergence yoke 52.

To adjust the system, the arms of potentiometers 72 and 108 are set to the grounded ends to cut off the dynamic control signals from devices 81 and 114. The parameters of the system are chosen so that sufficient current flows through these devices with this setting to over-converge the three beams 22, 23, 24 at the center of the screen. The permanent magnets 52C, 53C and 54C are then adjusted to tend to diverge the three beams from their over-converged condition to bring them into convergence at the center of the screen for the static convergence adjustment. Control 72 is adjusted to impress the horizontal dynamic convergence signal on device 81 with the proper amplitude so that convergence is maintained as the beams are swept in the horizontal direction. Coil 70 is adjustable to provide a phasing control. This coil is manually adjusted to cause the horizontal dynamic convergence control signal to be clamped at the center of the screen for optimum operation of the system.

Likewise, control 108 is adjusted to impress the vertical dynamic convergence signal on device 114 with the proper amplitude so that convergence is maintained as the beams are swept in the vertical direction. In each case, the vertical and horizontal dynamic convergence signals are clamped by the grid-leak action of the devices 81 and 114 so that they do not affect the pre-set static convergence adjustment. Since winding 62 is incorporated in the horizontal output transformer 60, the pulses at the horizontal frequency will appear therein and these pulses are applied to the tuned circuit consisting of capactiors 64–66 and inductor 70. Capacitors 65 and 66 are used for impedance matching purposes. This tuned circuit develops in response to the pulses a signal corresponding substantially to a sine wave voltage at the horizontal frequency, a portion of which is applied to grid 80 by means of variable potentiometer 72 and capactior 82. It has been found that this signal is a sufficiently close approximation to the desired parabolic wave shape to be satisfactory for dynamic convergence of the electron beams in a tri-beam cathode ray tube. This sine wave voltage is converted into a current wave by electron valve 81 which flows through horizontal convergence coil 52*a* in order to dynamically converge the beam corresponding to yoke 52.

Coupling capacitor 82 and grid-leak resistor 84 are of values such that, with the other circuit parameters, grid 80 is self-biased by the dynamic signal impressed thereon. Thus, should the signal tend to cause grid 80 to rise above zero, grid current would be drawn causing self-biasing of the electron valve and effectively clamping the dynamic signal at the level of a static signal. Therefore, regardless of the amplitude of the dynamic signal, it does not shift the pre-set static convergence adjustment of the beams. It is, of course, apparent that by adjustment of potentiometer 72, the amplitude of the dynamic signal may be varied in order to obtain proper convergence at positions other than the center of the screen 30, and that such adjustment does not affect the clamped static level of this signal.

The vertical dynamic convergence signal is also clamped in a manner similar to that just described. A parabolic wave form of the vertical frequency, which is commonly 60 cycles, is obtained at one terminal of primary winding 102 through integration of the vertical scanning signal by means of capacitor 106. Thus, a parabolic wave form suitable for vertical dynamic convergence of a given beam is applied to control grid 112 of device 114 through capacitor 107, a portion of variable potentiometer 108 and coupling capacitor 110. Here also, the input circuit to control grid 112 is made self-biasing so that the parabolic wave form is effectively clamped at the level of the static convergence signal in order that the convergence of the beams at the center of the screen will not be disturbed as convergence is effected in other positions of the screen by means through variation of potentiometer 108.

Reference to Fig. 3 may be made for a better understanding of the horizontal clamping action. Fig. 3 shows the plate current-grid voltage ($i_p-l_c$) characteristic curve for device 81. Wave form 132 is the dynamic convergence signal input or instantaneous potential impressed upon grid 80 and wave form 134 is the instantaneous anode current. The anode current of the electron valve has a peak value of current 130 which flows through coil 52*a* to effect static convergence of the beam in conjunction with the permanent magnets 52*c*, 53*c*, 54*c*. Then, with a sine wave potential impressed upon the grid, as in the case of grid 80 in electron valve 81, the resulting plate current or wave form 134 flows through coil 52*a* for dynamic convergence control. This latter waveform can rise no higher than current 130 since, if grid 80 tends to rise above zero, grid current will be drawn through resistor 84, thus self-biasing the grid down to a point where no grid current is drawn. The current wave form during a single horizontal scanning cycle may extend between two limits designated 135, thus giving an approximation to a parabolic wave form with the peak thereof rising no higher than the static convergence signal level. It may be seen, therefore, that this circuit permits independent adjustment of the static and dynamic convergence signals.

In the case of the vertical convergence circuit, the signal impressed upon grid 112 will be a parabola at the vertical scanning frequency, as previously pointed out, rather than the sine wave signal 132 which is applied to grid 80. However, it is apparent that the clamping action will be the same in both the horizontal and vertical convergence circuits. The remaining electron beams which may also be properly converged, both statically and dynamically in horizontal and vertical directions by adjustments similar to those just described so that convergence coils 53 and 54 provide the proper fields for this result.

Fig. 4 shows an alternate form of the invention in which a separate diode 140 is used as a clamper in the input circuit to grid 142 of electron discharge device 144. The anode 145 and the cathode 146 of device 144 may be connected to a suitable potential supply (not shown) and to a convergence electrode associated with the cathode ray tube (not shown). In a manner similar to the discharge devices 81, 114 of Fig. 2 input terminal 150 may be connected to a suitable source of parabolic waves which are applied through coupling capacitor 152 to control grid 142 and to anode 153 of diode 140. Resistor 155 is connected from cathode to anode of diode 140. Cathode 157 is connected to the movable arm of potentiometer 160, one end of which is grounded and across which a biasing potential 162 is impressed. Biasing potential 162 is negative with respect to ground so that adjustment of the movable arm of potentiometer 160 will adjust the clamping level of diode 140 when a signal is impressed upon anode 153. Therefore, the input network to grid 142 including diode 140, capacitor 152 and resistor 155 and the biasing network for diode 140 will provide an adjustable self-biasing system for grid 142. A wave 151 applied to terminal 150 will then be clamped to rise no higher than the bias potential applied to grid 142 by means of the potential of source 162 and the adjustment of potentiometer 160.

It is apparent that the bias provided for grid 142 by adjustment of the potentiometer 160 may be used to provide a steady current flow in the anode circuit of electron tube 144 which may be connected to suitable convergence coils (such as coil 52*a*) in order to furnish a static convergence field. It may be seen that once the proper bias has been impressed on grid 142, that is one which provides the proper static convergence, it is only necessary to apply parabolic wave 151 to control grid 142 in order to obtain dynamic convergence of the beams. Diode 140 will then provide the clamping action to maintain the dynamic signal at a level no higher than the fixed static bias level on grid 142 despite adjustments of the dynamic signal. Therefore, this circuit also provides separate and independent adjustment of the dynamic and static convergence signal for a tri-beam cathode ray tube, and does not require adjustable permanent magnets.

It is apparent that this invention provides circuitry which greatly simplifies the adjustment of the convergence circuits in a color television receiver utilizing a tri-beam cathode ray tube. With the described circuit, it is possible to adjust the electron beams for static convergence and then to adjust them independently for dynamic convergence without causing misconvergence at the static position. Therefore, this system greatly simplifies and expedites the alignment of a color television receiver. When so desired, the convergence circuits 125 and 126 of Fig. 2 may consist of discharge devices such as tubes 81 and 114, with their associated input circuits 82, 84 and 110, 117. With such an arrangement, the tuned circuit 64, 65, 66 and 70 is common to all three horizontal systems, with independent horizontal controls or with potentiometer 72 serving as a common horizontal control for all three beams. Likewise, circuit 104, 106, 107 is common to all three vertical systems, with independent vertical controls or with potentiometer 108 serving as a common vertical control for all three beams.

I claim:

1. In a television receiver which includes a cathode ray image reproducing tube utilizing a plurality of beam components, field producing means for developing a control effect to converge the beam components, and a sweep system for supplying to the cathode ray tube a deflection signal of a selected frequency for scanning the beam components, a system for controlling the dynamic convergence of the beam components including in combination, a convergence circuit coupled to the sweep system for developing a dynamic convergence control signal of substantially the selected frequency and having a wave form with a peak portion corresponding substantially to a midrange scanned position of the beam components, said convergence circuit including means coupled to the field producing means including a series connected capacitor to apply the convergence control signal to the field producing means, and an electron valve direct-current coupled to the field producing means and poled to conduct during the peak portion of the convergence control signal for charging said capacitor and controlling the level of the convergence control signal applied to the field producing means.

2. In a television receiver which includes a cathode ray image reproducing tube utilizing a plurality of beam components, field producing means for developing a control effect to converge the beam components, and a sweep system for supplying to the cathode ray tube a deflection signal of a selected frequency for scanning the beam components, a system for controlling the dynamic convergence of the beam components including in combination, a convergence circuit coupled to the sweep system for developing a dynamic convergence control signal of substantially the selected frequency and subject to variation in amplitude, said convergence control signal having a wave form with a peak portion corresponding substantially to a central scanned position of the beam components, said convergence circuit including a capacitor coupled to the field producing means through which the convergence control signals are applied thereto and an electron valve device coupled in a direct current conducting circuit across the field producing means with said electron valve device poled to conduct during the peak portion of the convergence control signal for charging said capacitor and clamping the peak portion of the convergence control signal to a reference level of the direct current conducting circuit upon amplitude variations of the convergence control signal.

3. In a color television receiver which includes a multi-beam cathode ray image reproducing tube, convergence effecting means for developing a control effect to converge the beams, and a sweep system for supplying to the cathode ray tube a deflection signal of a selected frequency for scanning the cathode ray beams, a system for controlling the dynamic and static convergence of the beams including in combination, an adjustable convergence circuit coupled to the sweep system for developing a dynamic convergence control signal, an electron discharge device having an input circuit coupled to said convergence circuit and an output circuit coupled to the convergence effecting means, said output circuit applying a static convergence signal and said dynamic convergence control signal to said convergence effecting means, and said input circuit including biasing and clamping means to maintain said dynamic convergence control signal as applied to said convergence effecting means no higher than the level of the static convergence signal.

4. In a color television receiver which includes a cathode ray image reproducing tube having means for developing a plurality of cathode ray beams therein, yoke means for controlling the convergence of such beams, and a sweep system for supplying to the cathode ray tube a deflection signal of a selected frequency for scanning the cathode ray beams, a system for controlling the dynamic and static convergence of the beams including in combination, a network coupled to the sweep system for developing a dynamic convergence control signal, an electron discharge device having an emission element, an output element and a control element zero-biased with respect to said emission element, input circuit means including self-biasing means for applying said dynamic convergence signal to said control element, output circuit means coupling said output element to the yoke means to apply said dynamic convergence control signal thereto, said output circuit means including power supply means for energizing said electron discharge device to develop a static convergence control signal in the yoke means, whereby said power supply means establishes the level of said static convergence signal and clamping action of said control element maintains the dynamic convergence control no higher than the established level of said static convergence signal.

5. In a color television receiver which includes a multi-beam cathode ray image reproducing tube, yoke means for controlling the convergence of the beams, and a sweep system for supplying to the cathode ray tube a deflection signal of a selected frequency for scanning the beams, a circuit for controlling the dynamic and static convergence of the beams including in combination, a network coupled to the sweep system for developing a dynamic convergence control signal, an electron discharge device having a cathode element, an anode element and a grid element, input circuit means for applying said dynamic convergence signal to said grid element in self-biasing and grid clamping relation, output circuit means coupling said anode element to the yoke means to apply said dynamic convergence control signal thereto, means including power supply means for energizing said electron discharge device to develop a static convergence control signal in the yoke means, whereby said power supply means establishes the level of said static convergence signal and clamping action of said grid element maintains the dynamic convergence control signal no higher than the established level of said static convergence signal.

6. In a color television receiver which includes a multibeam cathode ray image reproducing tube, convergence effecting means for developing a control effect to converge the beams, and a sweep system for supplying to the cathode ray tube a deflection signal of a selected frequency for scanning the cathode ray beams, a system for controlling the dynamic and static convergence of the beams including in combination, an adjustable convergence circuit coupled to the sweep system for developing a dynamic convergence control signal, an electron discharge device having an input circuit coupled to said convergence circuit and an output circuit coupled to the convergence effecting means, means for applying a static convergence signal to said convergence effecting means, and said input circuit including diode clamping means biased relative to the static convergence signal to maintain said dynamic convergence control signal no higher than the level of the static convergence signal so that a convergence control signal applied through said electron discharge device to said convergence effecting means is maintained no higher than the level of the static convergence signal.

7. In a color television receiver which includes a cathode ray image reproducing tube having means for developing a plurality of cathode ray beams therein, yoke means for controlling the convergence of such beams, and a sweep system for supplying to the cathode ray tube a deflection signal of a selected frequency for scanning the cathode ray beams across a receiving screen; a system for controlling the dynamic and static convergence of the beams including in combination, a network coupled to the sweep system for developing a dynamic convergence control signal, an electron discharge device having an anode, a cathode and a control electrode, an input circuit including self-biasing means for applying said dynamic convergence signal to said control electrode, an output circuit coupling said anode to the yoke means to apply said dynamic convergence signal thereto, said output circuit including power supply means for energizing said discharge device to develop a static control signal in the yoke means of sufficient strength to over-converge the beams at the center of the viewing screen, and adjustable permanent magnet means for diverging the over-converged beams to a converged state at the center of the screen, whereby said power supply means establishes the level of said static convergence signal and clamping action of said control element maintains the dynamic convergence control no higher than the established level of said static convergence signal.

8. In a television receiver which includes a cathode ray image reproducing tube utilizing a plurality of beam components, convergence effecting means for developing a control effect to converge the beam components, and a sweep system for supplying to the cathode ray tube a deflection signal of a selected frequency for scanning the beam components, a system for controlling the dynamic convergence of the beam components including in combination, a convergence circuit coupled to the sweep system for developing a dynamic convergence control signal, said convergence circuit including circuit means coupled to the convergence effecting means to energize the same and a diode coupled to said circuit means for regulating signals applied to the convergence effecting means.

9. In a television receiver which includes a cathode ray image reproducing tube utilizing a plurality of beam components, convergence coil means for developing a field to converge the beam components, and a sweep system for supplying to the cathode ray tube a deflection signal of a selected frequency for scanning the beam components, a system for controlling the dynamic convergence of the beam components including in combination, a convergence circuit including reactive elements coupled to the sweep system for developing substantially parabolic dynamic convergence control signals, said convergence circuit including circuit means coupled to the convergence coil means to energize the same and a diode coupled across said circuit means for controlling the level of signals applied to the convergence coil means.

10. In a color television receiver which includes a tri-beam cathode ray image reproducing tube, a horizontal sweep system to develop line scanning signals for the beams, and a vertical sweep system for developing field scanning signals for the beams, the convergence control system including in combination, a first source of convergence signals coupled to the vertical sweep system and energized thereby to provide dynamic convergence signals of substantially parabolic form at the field frequency, a second source of dynamic convergence signals including a variable resistor and reactive elements coupled to the line sweep system and energized thereby for developing substantially parabolic convergence control signals at the line frequency, said second source of signals including a rectifier device for maintaining the convergence signals at line frequency at a given level, a convergence coil adapted to be disposed adjacent the path of one of the beams for producing a magnetic field to control such beam, a permanent magnet member movable in the field of said convergence coil for modifying the field thereof, said convergence coil including a first portion coupled to the first source of signals and a second portion coupled to the second source of signals for energization of said convergence coil, whereby said permanent magnet member may be moved with respect to the field of said convergence coil for controlling static convergence and said variable resistor may be varied for controlling dynamic convergence of said one beam of the tube.

References Cited in the file of this patent

UNITED STATES PATENTS

| | | |
|---|---|---|
| 2,672,574 | Evans | Mar. 16, 1954 |
| 2,687,493 | Kirkwood | Aug. 24, 1954 |
| 2,707,248 | Goodrich | Apr. 26, 1955 |
| 2,726,354 | Stark | Dec. 6, 1955 |
| 2,728,022 | Carpenter | Dec. 20, 1955 |